United States Patent [19]

Yamana et al.

[11] Patent Number: 5,245,173
[45] Date of Patent: Sep. 14, 1993

[54] AUTOMATIC FOCAL-POINT SENSING APPARATUS SENSING HIGH AND LOW MAGNIFICATION

[75] Inventors: Motokazu Yamana; Nobuyuki Nagasawa; Hirokazu Konishi; Yasuteru Takahama, all of Hachioji, Japan

[73] Assignee: Olympus Optical Co., Ltd., Tokyo, Japan

[21] Appl. No.: 952,533
[22] PCT Filed: Mar. 30, 1992
[86] PCT No.: PCT/JP92/00393
§ 371 Date: Nov. 30, 1992
§ 102(e) Date: Nov. 30, 1992
[87] PCT Pub. No.: WO92/17805
PCT Pub. Date: Oct. 15, 1992

[30] Foreign Application Priority Data

Mar. 29, 1991 [JP] Japan .................. 3-089028
Apr. 5, 1991 [JP] Japan .................. 3-099854
Apr. 10, 1991 [JP] Japan .................. 3-077809

[51] Int. Cl.$^5$ .................................. G01J 1/20
[52] U.S. Cl. .................... 250/201.3; 250/201.7
[58] Field of Search .............. 250/201.3, 201.7; 359/379, 380, 381

[56] References Cited

U.S. PATENT DOCUMENTS

| | | | |
|---|---|---|---|
| 4,311,904 | 1/1982 | Okada et al. | 250/204 |
| 4,540,881 | 9/1985 | Hayashi et al. | 250/201.7 |
| 4,587,416 | 5/1986 | Kudo et al. | 250/204 |
| 4,621,191 | 11/1986 | Suzuki et al. | 250/201.7 |
| 4,803,352 | 2/1989 | Bierleutzeb | 250/201.3 |

FOREIGN PATENT DOCUMENTS 56-74208 6/1981 Japan .
57-148709 9/1982 Japan .
57-158813 9/1982 Japan .
59-68711 4/1984 Japan .
59-172617 9/1984 Japan .
59-177507 10/1984 Japan .
60-117208 6/1985 Japan .
61-13722 4/1986 Japan .
61-60413 12/1986 Japan .
62-299926 12/1987 Japan .
63-78113 4/1988 Japan .
3-37605 2/1991 Japan .

Primary Examiner—David C. Nelms
Assistant Examiner—S. B. Allen
Attorney, Agent, or Firm—Frishauf, Holtz, Goodman & Woodward

[57] ABSTRACT

An automatic focal-point sensing apparatus includes a lighting optical system (14, 15) for illuminating a specimen. An objective optical system (5), which receives the optical image from the specimen, forms a first optical image at a position a specified distance apart from and before the expected image formation plane and a second optical image at a position a specified distance apart from and after the expected image formation plane. At least one image sensor (6) converts the first and second optical images from the objective optical system (5) into corresponding electric signals. A magnification sensor (8) detects the magnification of the objective (2). The CPU (10) calculates the contrast of each of the first and second optical images on the basis of the electric signals. Further, the CPU (10), when the magnification of the objective (2) is low, detects the in-focus point based on the difference in contrast between the first and second optical images. In contrast, when the magnification is high, it moves a portion of the objective (2) or the specimen in the direction of the optical axis, and detects the in-focus point based on changes in the contrast of one or both of the first and second optical images.

12 Claims, 12 Drawing Sheets

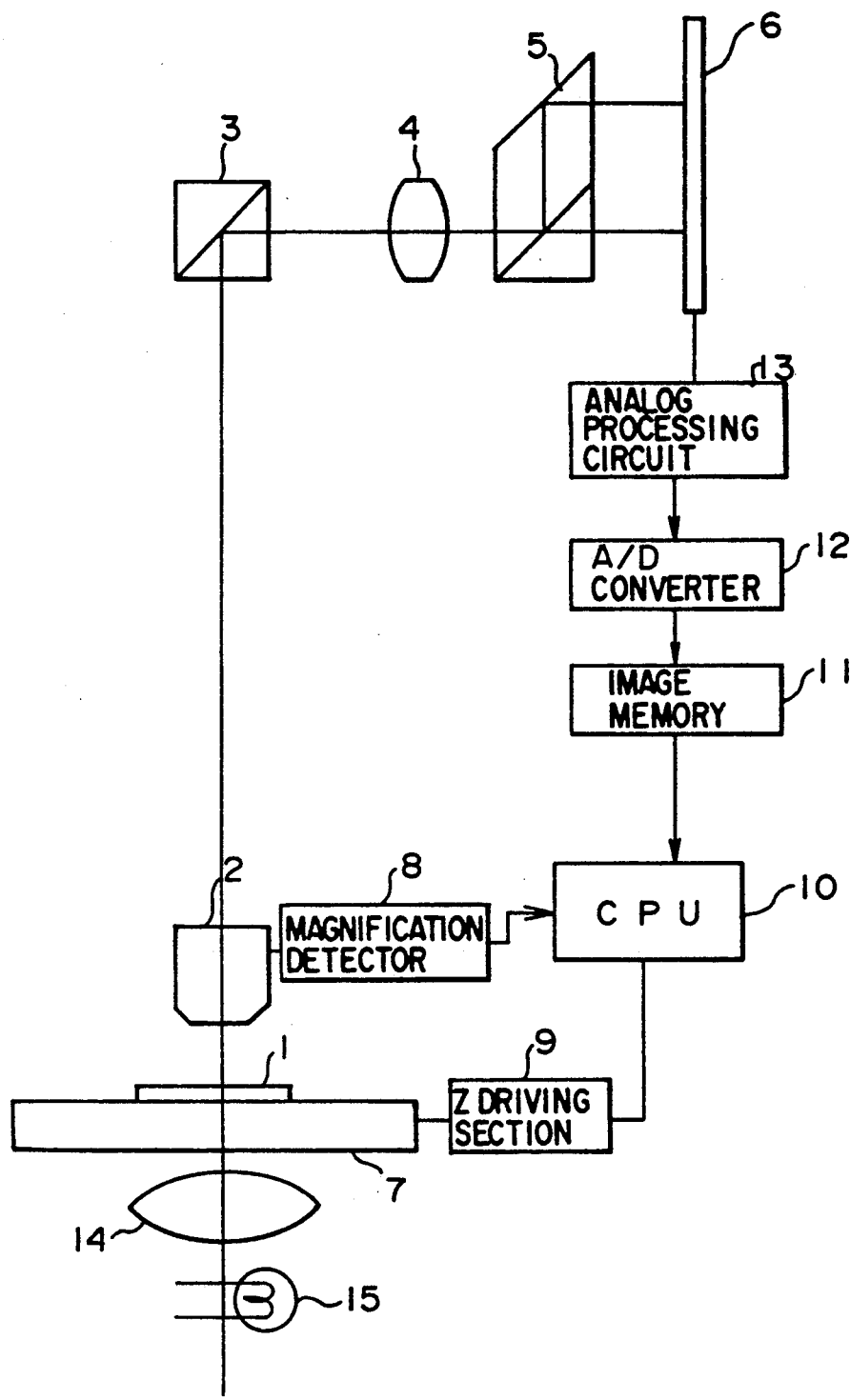
F I G. 1

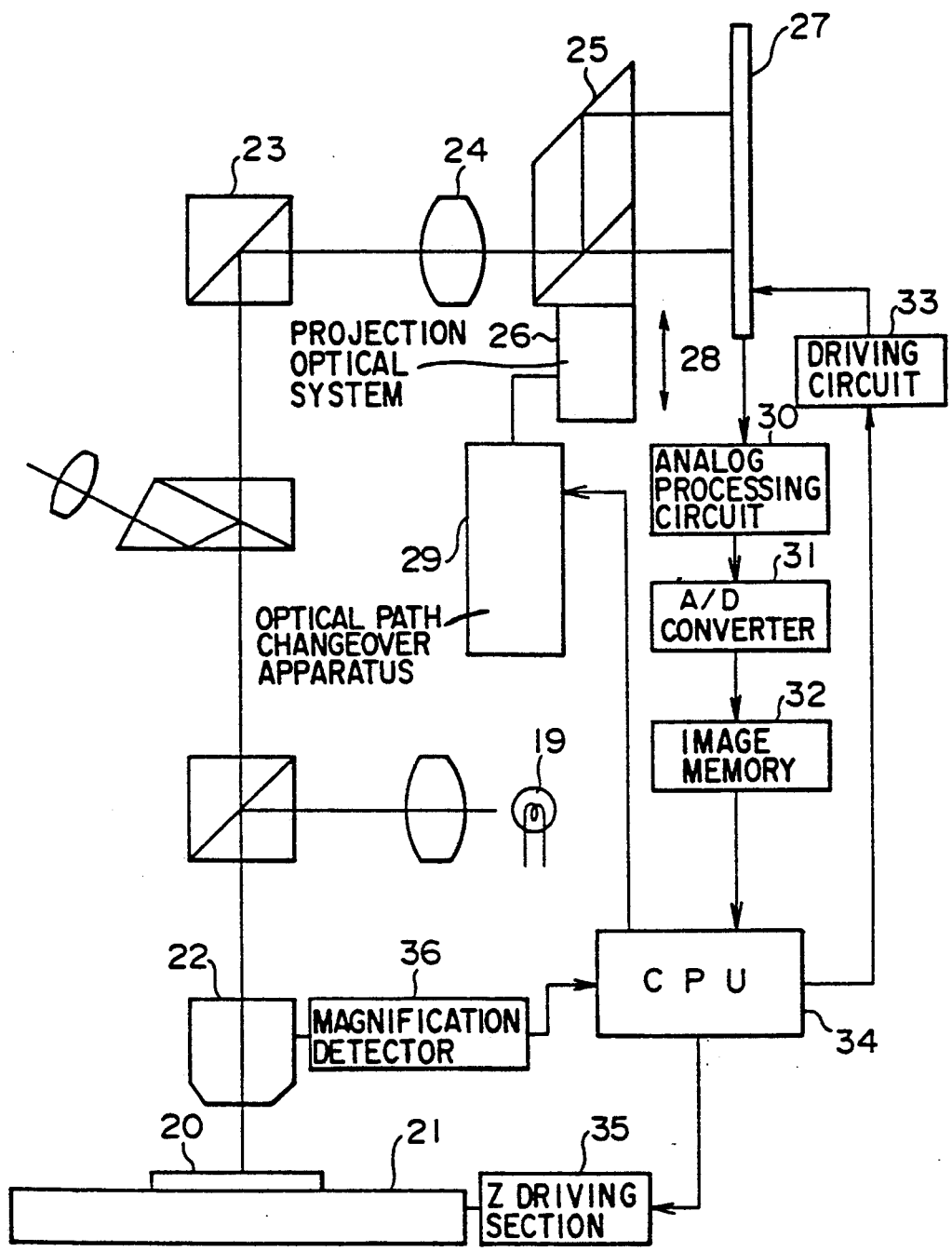
F I G. 3

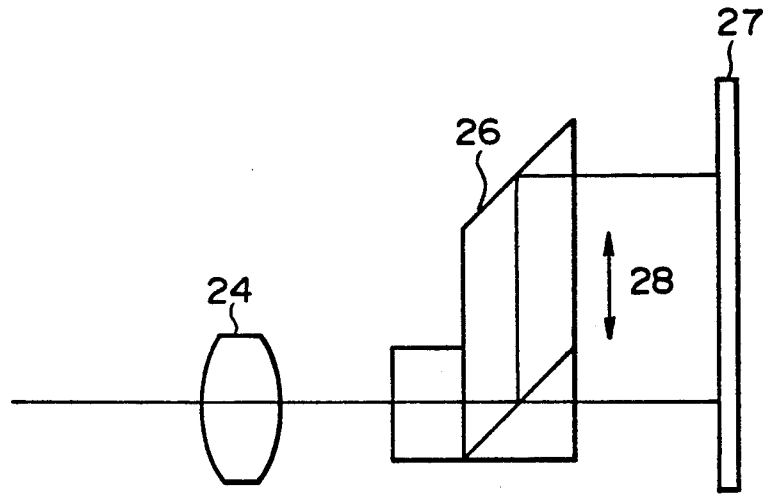
F I G. 4A
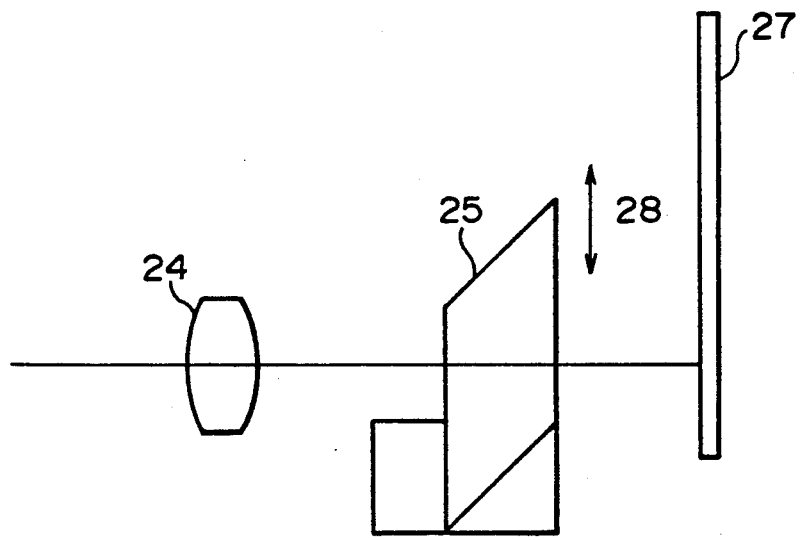
F I G. 4B

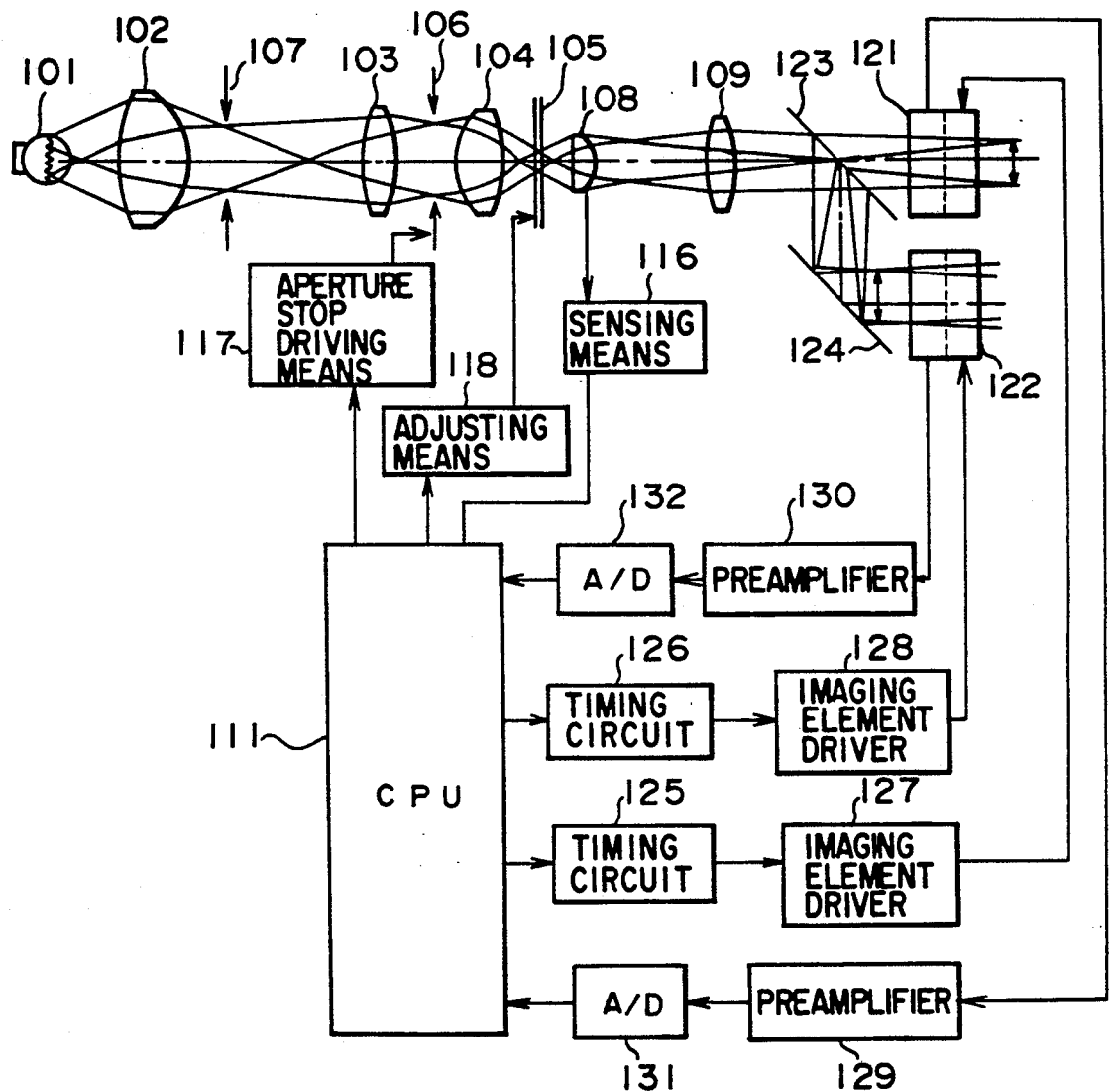
F I G. 7

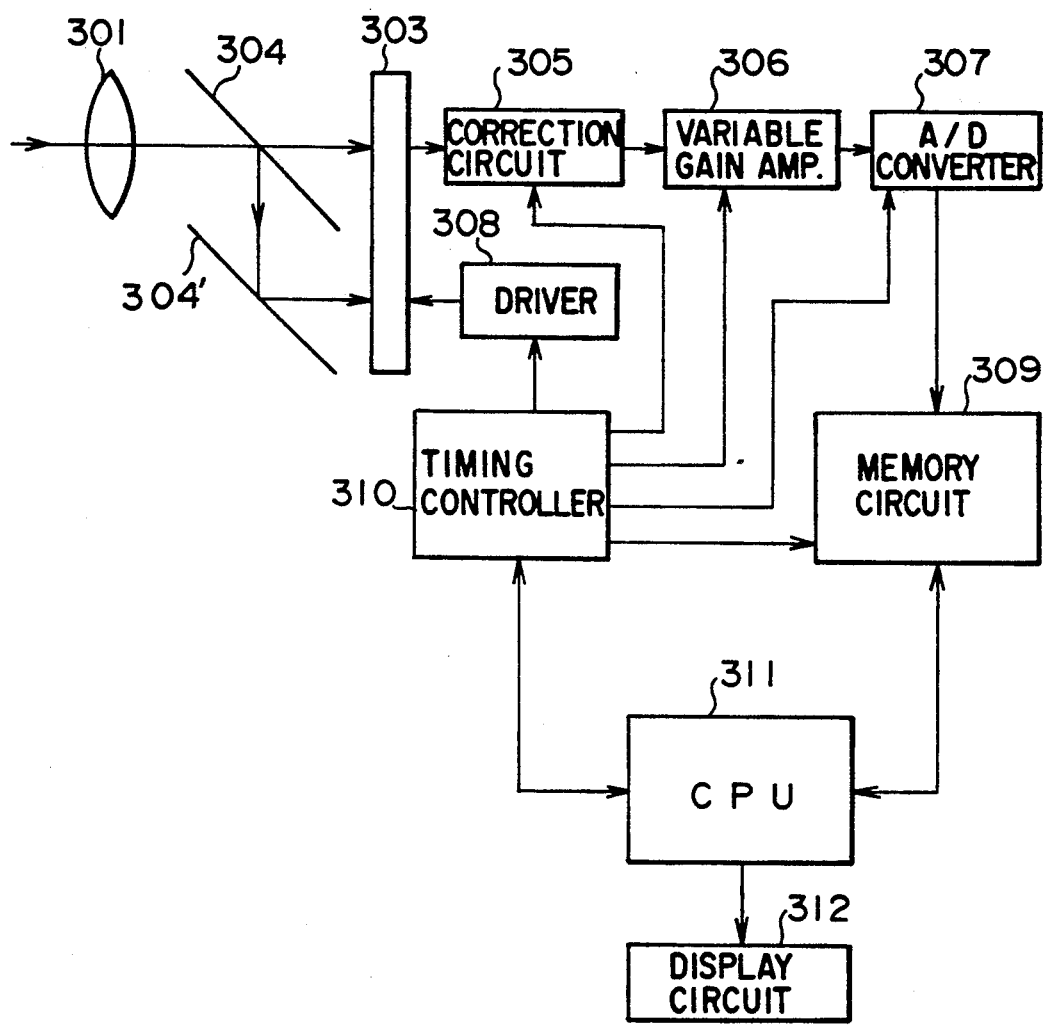
F I G. 10

AUTOMATIC FOCAL-POINT SENSING APPARATUS SENSING HIGH AND LOW MAGNIFICATION

BACKGROUND OF THE INVENTION

This invention relates to an in-focus sensing apparatus of optical equipment, such as a microscope, that allows observation in a wide range from low to high magnifications.

In connection with an apparatus that senses the optical images before and after the image formation plane with the image sensor, and adjusts the distance between the objective optical system and specimen so that the difference between the electric signals corresponding to the light intensities of those two optical images may be kept at a specified value, Published Examined Japanese Patent Application No. 61-60413 has disclosed a focal-point adjusting apparatus provided with means for varying the optical path between the image formation plane and image sensor as the magnification of the objective optical system is changed.

Additionally, Published Unexamined Japanese Patent Application No. 63-78113 has disclosed an automatic focal-point adjusting mechanism which divides the measuring light beam going from the subject to the line sensor into a plurality of light beams, shifts the light formation positions of the divided light beams forward and backward along the optical axis, performs the in-focus operation by comparing the signals of two optical images, and enables a high regular-transmission transparent member whose refractive index differs from that of air to withdraw into one of the divided light beams during the time from when the measuring light beam has been divided until the light beams reach the line sensor, in the optical path of the measuring light beam.

The method of projecting the optical images before and after the expected focal plane onto the image sensor and comparing the signals of two optical images to sense the in-focus point has a disadvantage in that use of a high-magnification objective makes the difference between the signals of two optical images before and after the expected focal plane so small that the in-focus point cannot be sensed. To solve this problem, a method has been proposed which is capable of changing the difference in the optical path between the expected focal plane and image sensor according to the change of the magnification of the optical system, such as the change of objectives, and which makes the optical path difference greater in the case of high magnification, as disclosed in Published Examined Japanese Patent Application No. 61-60413. This method, however, has disadvantages in that the large optical path difference necessary for high magnification makes the optical path space larger, consequently the apparatus greater, and that an arrangement to change the optical path difference is needed.

Another disadvantage is that at high magnification, since the optical image is divided into two optical images in spite of the amount of light of the original optical image is very small, the amount of light of the resulting images is even smaller, which makes the sensing of the in-focus point difficult.

SUMMARY OF INVENTION

Accordingly, the object of the present invention is to provide an automatic focal-point sensing apparatus capable of sensing the in-focus point with high accuracy in the range from low to high magnifications.

The foregoing object is accomplished by providing an automatic focal-point sensing apparatus comprising:

a lighting optical system for illuminating a specimen;

an objective optical system which receives the optical image from said specimen illuminated by said lighting optical system, and which forms a first optical image at a position a specified distance apart from and before the expected image formation plane and a second optical image at a position a specified distance apart from and after the expected image formation plane;

at least one image sensor which has a first and a second light-receiving sections that receive said first and second optical images from said objective optical system, and which converts said first and second optical images received into corresponding electric signals;

magnification sensing means for detecting the magnification of said objective optical system;

computing means for calculating the contrast of each of said first and second optical images on the basis of said electric signals from said at least one image sensor; and in-focus sensing means which, when the sense result at said magnification sensing means is a low magnification, detects the in-focus point based on the difference in contrast between said first and second optical images calculated at said computing means, and which, when the sense result at said magnification sensing means is a high magnification, moves a portion of said objective optical system or said specimen in the direction of the optical axis, and detects the in-focus point based on changes in the contrast of one or both of said first and second optical images.

The foregoing object is also accomplished by providing an automatic focal-point sensing apparatus comprising:

a lighting optical system for illuminating a specimen;

a first optical system which receives the optical image from said specimen illuminated by said lighting optical system, and which forms a first optical image at a position a specified distance apart from and before the expected image formation plane and a second optical image at a position a specified distance apart from and after the expected image formation plane;

at least one image sensor which has a first and second light-receiving sections that receive said first and second optical images from said objective optical system, and which converts said first and second optical images received into corresponding electric signals;

a second optical system provided adjacent to said first optical system so that the optical image from said specimen may be projected onto said expected image formation plane only; and in-focus sensing means for detecting the in-focus point by switching between said first and second optical systems according to specified conditions.

BRIEF DESCRIPTION OF DRAWINGS

FIG. 1 is a schematic diagram showing the construction of an automatic focal-point sensing apparatus according to a first embodiment of the present invention;

FIG. 3 is a schematic diagram showing the construction of an automatic focal-point sensing apparatus to which the second and a third embodiment of the present invention has been applied;

FIGS. 4A and 4B are optical arrangement diagrams for explaining a modification of the second embodiment;

FIG. 7 is a schematic diagram showing the construction of an automatic focal-point sensing apparatus to which a fifth embodiment of the present invention has been applied;

FIG. 10 is a schematic diagram showing the construction of an automatic focal-point sensing apparatus to which the sixth embodiment has been applied;

DETAILED DESCRIPTION

Figure 2A:
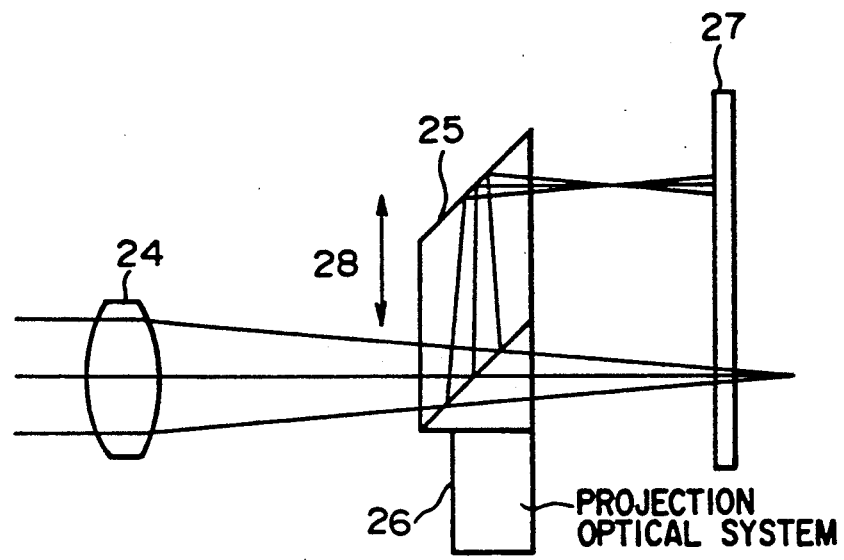
FIGS. 2A and 2B are optical arrangement diagrams for explaining a basic concept of a second embodiment of the present invention.

A basic concept of an automatic focal-point sensing apparatus according to a first embodiment of the present invention will be explained, referring to FIG. 1.

In the first embodiment, when the magnification of an objective 2 sensed by a magnification detector 8 is low, a CPU 10 computes the difference in contrast and others between two images to detect the in-focus point. For a high magnification, the CPU 10 takes in the image signal or signals of one or both of two images, while causing a Z driving section 9 to move a stage 7, and detects the in-focus point based on changes in the in-focus evaluations, including contrast, as a result of the change of the position of the stage 7.

With a high-magnification objective, since there is no difference between an image before the expected focal plane and that after the plane, it is difficult to obtain the in-focus point from the difference in contrast and others between the two images. Because of this, the in-focus point is determined on the basis of the relationship between changes in the in-focus evaluations and the movement of the stage, which makes it possible to detect the in-focus point for objectives with low to high magnifications.

Referring to FIG. 1, the operation of the first embodiment will be explained.

The optical image of a specimen 1 illuminated by a lighting optical system composed of a light source 15 and a condenser lens 14, passes through the objective 2, a prism 3, and an image formation lens 4, and is divided by an optical path difference prism 5 into two parallel light beams. Then, the optical images before and after the expected focal plane are projected onto the light-receiving surface of an image sensor 6. The optical images before and after the expected focal plane projected onto the light-receiving surface undergo photoelectric conversion at the image sensor 6, and the resulting signal is passed through an analog processing circuit 13 and an A/D converter 12 to form digital data, which is then stored in a image memory 11.

The magnification of the objective 2 is detected by the magnification detector 8 and supplied to the CPU 10. When it is sensed that the objective 2 has a low magnification, the CPU 10 reads the image signals before and after the expected focal plane from the image memory 11, and computes the in-focus evaluations including contrast to determine the amount and direction of deviation from the in-focus point on the basis of the difference between in-focus evaluations before and after the expected focal plane.

When it is sensed that the magnification of the objective 2 is high, the CPU 10 reads the image signals before and after the expected focal plane from the image memory 11, while causing the Z driving section 9 to move the stage 7 movable up and down for focal-point adjustment, computes the relationship between the amount of movement of the stage 7 and the in-focus evaluations for one or both of the two images before and after the expected focal plane, and obtain the in-focus point from the computation results.

As described above, automatic focal-point sensing suited for low to high magnifications can be achieved by switching between focal-point sensing methods based on the magnification of the objective.

A basic concept of a second embodiment of the present invention will be explained, referring to FIGS. 2A and 2B. In those figures, numeral 24 indicates an image formation lens, and 25 represents an optical system in which optical images, each having the same optical path difference before and after the expected focal plane, are projected by an optical path difference prism onto the light-receiving surface of an image sensor 27. Numeral 26 denotes an expected focal-plane projection optical system, which is constructed so that the light-receiving surface of the image sensor 27 may be the expected focal plane.

Figure 2B:
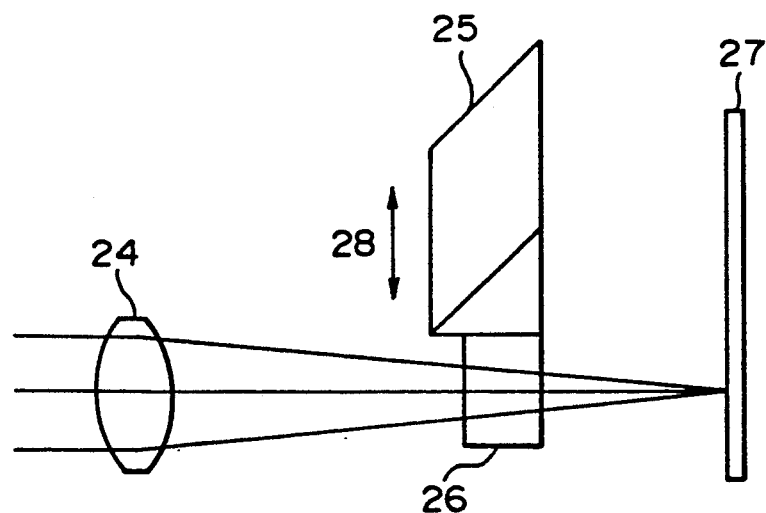

The optical path difference prism 25 and expected focal-plane projection optical system 26 are both movable in the direction indicated by numeral 28 in FIGS. 2A and 2B. When the objective 22 (see FIG. 3) is low in magnification and the optical image is sufficiently light, the optical path difference prism 25 is inserted into the optical path running from the image formation lens 24 to the image sensor 27 as shown in FIG. 2A. When the magnification of the objective 22 is high or when the magnification is low and the optical image is dark, the expected focal-plane projection optical system 26 is inserted into the optical path extending from the image formation lens 24 to the image sensor 27.

Specifically, when the objective 22 (see FIG. 3) is low in magnification and the optical image is sufficiently light, the optical system is constructed as shown in FIG. 2A, and the contrast and others of two images before and after the expected focal-plane are compared to determine the in-focus point. When the objective 22 (see FIG. 3) is high in magnification, or when the magnification is low and the optical image is dark, the optical system is constructed as shown in FIG. 2B, the relative distance between the objective 22 and the specimen 20 (see FIG. 3) to be observed is changed to search for the maximum point of the in-focus evaluations including contrast to determine the in-focus point.

At low magnifications, even a small optical path difference easily creates differences between the in-focus evaluations of the optical images before and after the expected focal-plane during defocusing, which allows the direction and amount of defocusing to be sensed through one image input, contributing toward making the sensing of in-focus point more accurate and faster. At high magnifications, however, the in-focus evaluations of optical images before and after the expected focal plane hardly differ from each other even during defocusing. Additionally, at high or low magnifications, when the optical image is dark, the amount of light passing through the image formation lens 24 is very small, making it very unfavorable to divide the optical path. As explained in the present embodiment, an in-focus point sensing suited for a wide range from low to high magnifications can be achieved with a simple construction by a method: when the magnification is high, or when the magnification is low and the optical image is dark, the optical path will not be divided, the optical image be projected so that the light-receiving surface of the image sensor 27 may be the expected focal plane, and the relative distance between the objective 22 and the specimen 20 (see FIG. 3) to be observed be changed to search for the maximum point of the in-focus evaluation level.

What will be explained hereinafter is the operation of an automatic focal-point sensing apparatus of FIG. 3 to which the second embodiment has been applied.

A reflected illumination system 19 is used to illuminate the specimen 20 to be observed. A stage 21 is moved up and down for focusing. The optical image reflected from the specimen 20 passes through an objective 22, a prism 23, and an image formation lens 24, and is projected onto the image sensor 27. In this embodiment, inserted in the optical path running from the image formation lens 24 to the image sensor 27 are two types of optical systems: an optical path difference prism 25 that splits the optical path into two parallel optical paths, and an expected focal-plane projection optical system 26 that does not divide the optical path. That is, the optical path difference prism 25 and expected focal-plane projection optical system 26 are both moved by an optical path changeover apparatus 29 in the direction indicated by numeral 28 for changeover of two types of optical systems.

When the optical path difference prism 25 is inserted into the optical path, the optical images before and after the expected focal-plane are projected onto the light-receiving surface of the image sensor 27. On the other hand, when the expected focal-plane projection optical system 26 is inserted into the optical path, the light image on the expected focal plane is thrown onto the light-receiving surface of the image sensor 27.

The sensing operation of the in-focus point will be described. The magnification of the objective 22 is sensed by the magnification sensor 36. Based on the sense result, the CPU 34 drives the optical path changeover apparatus 29 in such a manner that the optical path difference prism 25 is inserted into the optical path when the magnification is low, and the expected focal-plane projection optical system 26 is interposed in that path in the case of high magnifications. The image sensor 27 is driven by the driving circuit 33. For the low-magnification objective lens 22, since the optical path difference prism 25 is in the optical path, the optical images before and after the expected focal plane are projected onto the light-receiving surface of the image sensor 27. The image signal converted photoelectrically at the image sensor 27 passes through the analog processing circuit 30 and the A/D converter 31, and enters the image memory 32.

The CPU 34 reads the image signal from the image memory 32, compares the states of the images before and after the expected focal plane, compute the direction and amount of deviation from the in-focus point, and causes the Z driving section 35 to move the stage 21 by a specified amount to attain the in-focus condition.

When the magnification of the objective 22 is high, since the expected focal-plane projection optical system 26 is in the optical path, the optical image on the expected focal plane is projected onto the light-receiving surface of the image sensor 27, and the image signal converted photoelectrically at the image sensor 27 passes through the analog processing circuit 30 and A/D converter 31, and enters the image memory 32. The CPU 34 reads the image signal from the image memory 32 to compute the in-focus degree, and causes the Z driving section 35 to move the stage 21 to the position at which the in-focus degree is the highest to achieve the in-focus state.

During observation of an specimen under a microscope, objectives with low magnifications are generally often replaced with those with high magnifications, or vice versa. When the magnification of the objective is changed, it is difficult to detect the focal point on the conventional apparatus. In connection with the method of comparing images on the expected focal plane, the method of changing the optical path length between the expected focal plane and image sensor according to the magnification has been proposed, as disclosed in Published Examined Japanese Patent Application No. 61-60413. With this method, however, to cope with high magnifications, it is necessary to make the optical path length very long to create a noticeable difference between images before and after the expected focal plane, This makes the apparatus larger. In addition, it is difficult to project two images on a single image sensor. Furthermore, since at high magnifications, the amount of light of the optical image is small, division of the optical path is very disadvantageous.

In contrast, according to the second embodiment, in-focus sensing suited for low to high magnifications is possible with a simple apparatus. Additionally, since the optical path is not divided at high magnifications where the amount of light is small, then the image can be projected onto the image sensor without reducing the amount of light of the optical image.

Referring to FIGS. 4A and 4B, a modification of the second embodiment will be explained. Numeral 24 indicates an image formation lens, and 25 an optical path difference prism movable in the direction indicated by numeral 28. With the construction of FIG. 4A, the optical image passing through the image forming lens 24 undergoes optical path division at the optical path difference prism 25, and the optical image before the expected focal plane and one after that plane are projected onto the light-receiving surface of the image sensor 27. Then, when the optical path difference prism 25 is moved in the direction indicated by numeral 28 to switch to the optical path as shown in FIG. 4B, the optical image that has transmitted the image formation lens 24 passes through the optical path difference prism 25 without any change, and the optical image on the expected focal plane is thrown onto the light-receiving surface of the image sensor 27.

As noted above, by moving the optical path difference prism 25 in the direction indicated by numeral 28, it is possible to switch between one optical system that projects two images before and after the expected focal plane onto the image sensor 27 and the other optical system that throws the image on the expected focal plane onto the image sensor 27.

A third embodiment of the present invention will be explained, referring to FIG. 3.

In general, observation of a specimen under a microscope is made, while several types of objectives with low to high magnifications are being changed. Because of this, even when a similar specimen is being observed, a change in the in-focus evaluation level concerning the distance between the objective and the specimen differs with the magnification of the objective or with the observation method. In the third embodiment whose construction is similar to that of the second embodiment, a specimen is set under the microscope. The Z driving section 35 moves the stage 21 at specified intervals centered at the in-focus position for the magnification or others of each objective or the observation method. The image signal at each position photoelectrically converted by the image sensor 27 passes through the analog processing circuit 30, A/D converter 31, and image memory 32, and enters the CPU 34. The CPU 34 computes the in-focus evaluation level, obtains the relationship between the position of the stage 21 and the in-focus evaluation level for the magnification and others of each objective or the observation method, and stores the resulting initial setting data.

The sensing of the in-focus point is done in the same manner as with the second embodiment. Specifically, for the objective 22 with a low magnification, the optical path difference prism 25 is inserted into the optical path, whereas for that with a high magnification, the expected focal-plane projection optical system 26 is interposed in the path. When the magnification of the objective 22 is low and the optical image is sufficiently light, since the optical path difference prism 25 is in the optical path, the images before and after the expected focal plane are projected onto the light-receiving surface of the image sensor 27. The image signal photoelectrically converted by the image sensor 27 passes through the analog processing circuit 30 and A/D converter 31, and is stored in the image memory 32. The CPU 34 reads the image signal from the image memory, compares the image states before and after the expected focal plane, while referring to the stored relationship between the in-focus evaluation level and the position of the stage 21, to compute the direction and amount of deviation from the in-focus point, and caused the Z driving section 35 to move the stage 21 by a specified amount to achieve the in-focus state.

When the magnification of the objective 22 is high, or when the CPU has judged that the illuminance at the light-receiving surface of the image sensor 27 is low at low magnifications, the expected focal-plane projection optical system 26 is inserted in the optical path. Projected onto the light-receiving surface of the image sensor 27 is the optical image The image signal photoelectrically converted by the image sensor 27 goes through the analog processing circuit 30 and A/D converter 31, and is stored in the image memory 32. The CPU 34 reads the image signal from the image memory 32, computes the in-focus position, referring to the stored relationship between the in-focus evaluation level and the position of the stage 21, and based on the result, causes the Z driving section 35 to move the stage 21 to a position at which the in-focus degree is the highest to achieve the in-focus state.

Particularly, when the magnification of the objective 22 is high, since only the image on the expected focal plane is supplied, the direction and amount of deviation from the in-focus point cannot be calculated accurately from only one input of the image. To avoid this problem, the relationship between the stage position and the in-focus evaluation level is stored according to optical conditions including the magnification of objectives, the observation method, and their combinations, as with the present embodiment; by performing an in-focus sensing computation based on those stored initial setting data items and the image input results, it is possible to make in-focus sensing faster and more accurate even at high magnifications.

As described so far, with the first to third embodiments, (1) changing the in-focus sensing method according to the objective magnification allows the realization of automatic focal point sensing suitable for a wide range from low to high magnifications; and (2) by changing over the optical image projection systems for the image sensor according to optical conditions including the objective magnification and other conditions such as the brightness of the image, automatic focal point sensing suitable for a wide range from low to high magnification can be achieved with a simple arrangement. Especially, at high magnifications, the optical path division method can hardly sense the in-focus point unless the optical path difference is made large. With the present invention, however, the optical path is not divided at high magnifications or at low illuminance, thereby reducing the amount of light due to optical path division.

The concept of a fourth embodiment of the present invention will be explained.

This embodiment is provided with an aperture stop for changing the numerical aperture of a lighting optical system, and aperture-stop driving means for driving the aperture stop. The aperture stop driving means is controlled on the basis of the image information obtained from a row of light-receiving elements and/or optical conditions including the numerical aperture of the image formation optical system, so that the defocus characteristics of the in-focus evaluation curve at high magnifications of the objective may approximate that at low magnifications as much as possible, thereby reducing the adverse effect of magnification change.

Figure 5A:
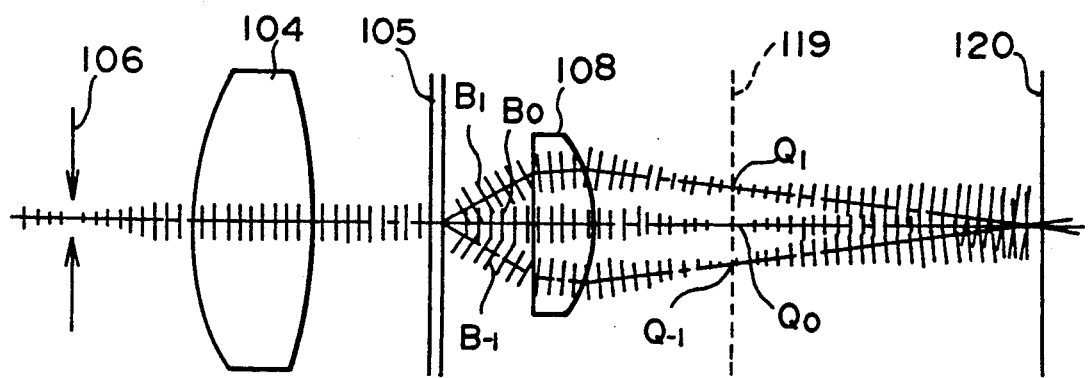
FIGS. 5A and 5B are diagrams for explaining the principle of a forth embodiment of the present invention.
Figure 5B:
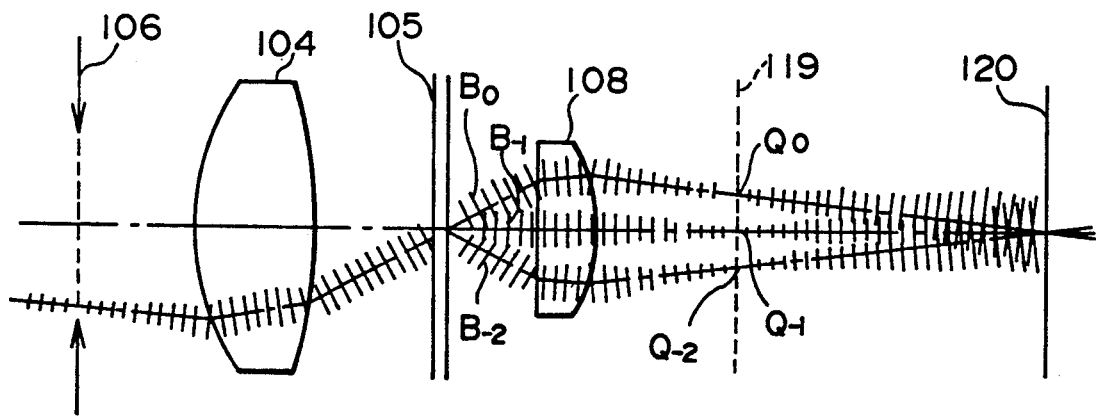

Referring to FIGS. 5A and 5B, an explanation will be given about the principle that the defocus characteristics of the in-focus evaluation curve obtained by performing an operation on the output signal from the light-receiving element row can be changed by changing the numerical aperture of the lighting optical system.

It is well known from Abbe's theorem that image formation by the microscope objective is considered to be wave-optics two-stage mapping-diffraction and interference. The figure schematically illustrates image formation by a microscope objective. FIG. 5A shows the vicinity of the center of the light source, more exactly, the light emerging from a point on the optical axis and passing through the center of the aperture stop 106, when the aperture stop 106 of the lighting optical system is stopped further down. FIG. 5B shows the light emerging from a point at the edge of the light source and passing through the outermost portions of the aperture stop 106, when the aperture stop 106 of the lighting optical system is opened wide.

In FIG. 5A, the lighting rays of plane wave (parallel rays) move in parallel with the optical axis after passing through the center of the aperture stop 106 and the condenser lens 104, and uniformly illuminate the object to observed 105. It is assumed that the object 105 is a sinusoidal grating with a pitch of P. The diffraction light from the object 105 proceeds in the form of parallel rays in three directions: the 0-order light B0 in the incident direction of the lighting rays, or in the direction of the optical axis, and the +1-order diffraction light B1 with the $+\theta$ direction with the axis and the $-1$-order diffraction light B-1 with $-\theta$ direction with the axis. In this case, the angle of diffraction $\theta$ is expressed as:

$$\sin\theta = \lambda/P$$

where P is the pitch of the grating and $\lambda$ is a wavelength.

As seen from the equation, the smaller the pitch P (the higher the frequency), the greater the diffraction angle $\theta$.

Then, the three light beams B0, B1, and B-1 pass through the objective 108 and form Fraunhofer diffraction images Q0, Q1, and Q-1 on the back focal plane 119 of the objective 108. They further move on, making spherical surfaces centered at Q0, Q1, and Q-1, and form the clearest interference image on the expected image formation plane 120 of the object 105. This interference image is a sinusoidal grading similar to the object to observed 105. Its pitch P' is expressed as:

$$P' = m \cdot P$$

where m is the magnification of the objective 108.

Since the actual object to be observed 105 is considered to be a combination of sinusoidal gratings with various pitches, the object image formed by the objective 108 can be said to be a combination of numerous sinusoidal gratings of high-order diffraction waves (higher harmonics) with various diffraction angles. To reproduce the correct image, it is necessary to throw those numerous higher harmonics onto the objective 108. In actual fact, however, because the numerical aperture of the objective 108 is limited, what is the highest order diffraction light for the numerical aperture, or the resolving power, is determined.

When the aperture stop 106 is opened wide as shown in FIG. 5B, the high-order diffraction light B-2 caused by lighting rays passing through the peripheral portions of the aperture stop 106 can be collected even if the numerical aperture of the objective 108 is the same, so that its Fraunhofer diffraction image Q-2 can be formed onto the back focal plane 119. Instead, the diffraction light B1 on the positive side cannot be gathered by the objective 108. As a result, the wide-open aperture stop 106 allows the formation of an object image with a higher proportion of higher harmonics, making the focal depth at the expected image formation plane 120 smaller.

In this way, by changing the numerical aperture of the lighting optical system by the aperture stop 106, the defocus characteristics of the in-focus evaluation curve obtained by performing an operation on the output signal from the light-receiving element row can be changed without degrading the performance of the objective 108 at all.

In FIGS. 5A and 5B, when stop means is placed in the optical path extending from the objective (the image formation optical system) 108 to the expected image formation plane (the position of the light-receiving element row), for example, at the back focal plane 119 of the objective 108, high-order diffraction rays are cut off as in the case of the numerical aperture of the objective 108 itself becoming smaller, so that the performance of the objective 108 deteriorates, resulting in an unacceptable in-focus evaluation.

In this embodiment, the aperture stop 106 is driven by the aperture stop driving means on the basis of the image information obtained from the light-receiving element row and/or optical conditions including the numerical aperture of the image formation system, so that the control means may provide almost the optimum in-focus evaluation. Because of this, the numerical aperture of the lighting optical system can be automatically set so that almost the optimum in-focus evaluation may be obtained, each time the object to be observed 105 is changed or the optical conditions including the numerical aperture and focal length are changed due to the change of the objective. Consequently, with the microscopes and other optical instruments, it is possible to always achieve a highly accurate in-focus state even with the object to be observed that has various power spectra and under optical conditions including the numerical aperture of the image formation optical system, without modifying the existing construction greatly.

Figure 6:
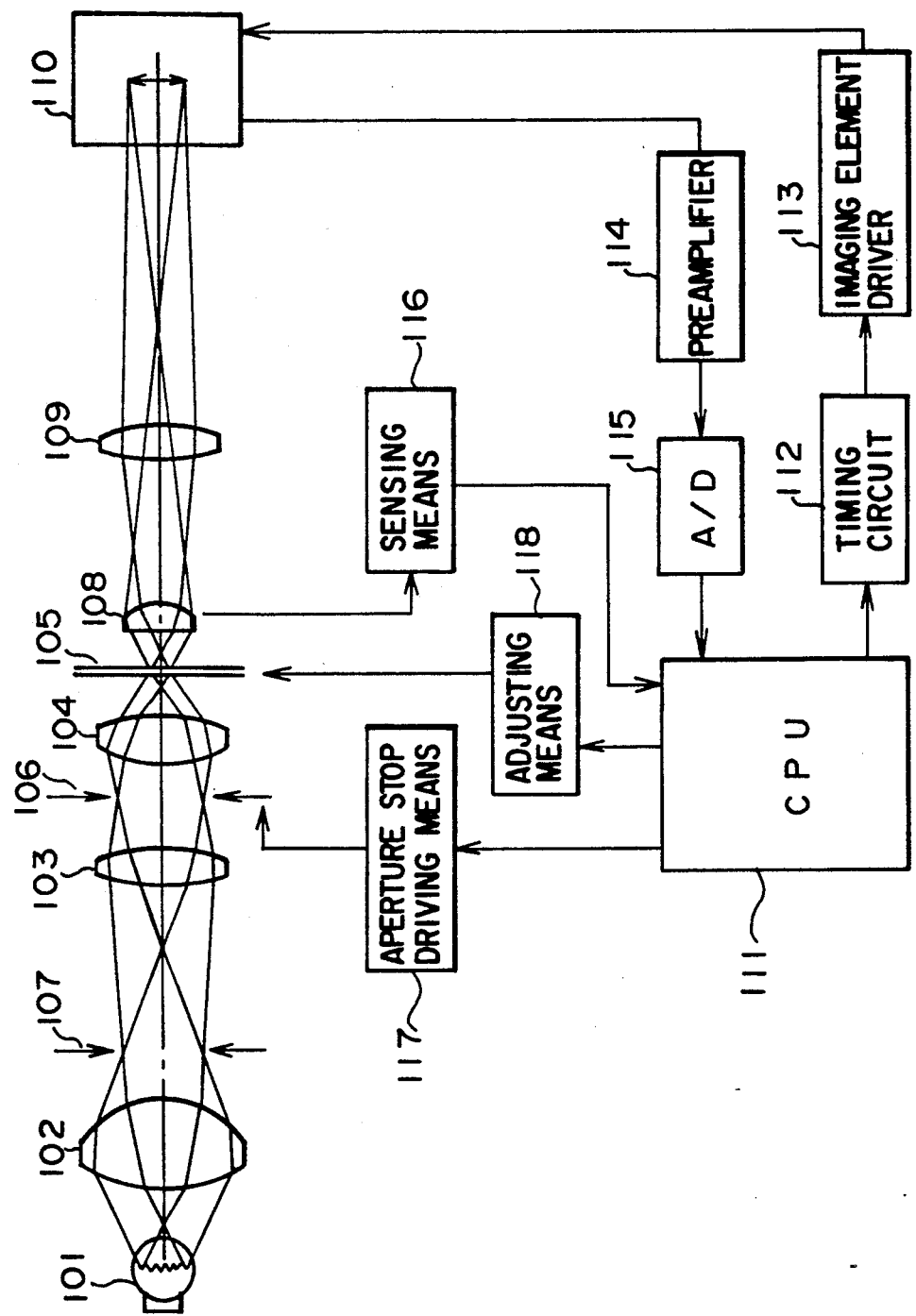
FIG. 6 is a schematic diagram showing the construction of an automatic focal-point sensing apparatus to which the forth embodiment has been applied.

FIG. 6 shows an example of an automatic focal point adjusting apparatus to which the fourth embodiment has been applied. The light from the light source 101 is gathered by a collector lens 102, and then directed via a lens 103 to a condenser lens 104, which illuminates the object to be observed 105 with parallel luminous flux of various angles.

In this embodiment, the aperture stop 106 is placed at the front focal plane of the condenser lens 104 at which the image of the light source 101 is formed, to change the numerical aperture of the lighting rays. Further, a field stop 107 is put at a position optically conjugate to the object 105 immediately after the collector lens 102, to change the lighting range of the object 105. That is, in this embodiment, the lighting optical system is constructed according to what is called the Kohler illumination method.

The light emerging from a point on the object to be observed 105 as a result of illumination by the lighting optical system, passes through the image formation optical system, or the objective 108 and image formation lens 109, and forms an image on an imaging element 110 made up of light-receiving element rows. The objective 108 (not shown) is attached to the revolver of the microscope so that an objective with a desired magnification may be selected from objectives with different magnifications. At the time of the in-focus state, the image formation plane of the aperture stop 106 of the lighting optical system agrees with the back focal plane of the objective 108, which allows the object to be observed 105 to have a conjugate positional relationship with the imaging element 110.

The control device (CPU) 111 sends an instruction via a timing circuit 112 and an imaging element driver 113 to drive the imaging element 110. The resulting image signal is amplified at a preamplifier 114, and then converted into a digital signal at an A/D converter 115, and supplied to the CPU 111.

The present embodiment is provided with sensing means 116 for detecting optical conditions including the magnification of the objective 108 selected and its numerical aperture, aperture stop driving means 117 for driving the aperture stop 106, and adjusting means 118 for relatively driving the objective 108 and the object to be observed 105 to adjust the distance between them. The output of the sensing means 116 is supplied to the CPU 111, which controls the aperture stop driving means 117 and adjusting means 118.

The operation of the present embodiment will be explained.

At a command to start the in-focus operation, the CPU 111 takes in optical conditions from the sensing means 116, and based on the optical conditions, drives the aperture stop 106 via the aperture stop driving means 117 to adjust the numerical aperture of the lighting optical system so as to achieve almost the optimum in-focus evaluation.

The optimum numerical aperture of the lighting optical system is such that it is smaller than the numerical aperture suitable for observation when the magnification of the objective 108 is low (the numerical aperture is small), whereas it is larger than the numerical aperture suitable for observation when the magnification is high (the numerical aperture is large).

After the numerical aperture of the lighting optical system has been adjusted so that almost the optimum in-focus evaluation may be obtained, the CPU 111 drives the imaging element 110 via the timing circuit 112 and imaging element driver 113. The resulting image signal is supplied via the preamplifier 114 and A/D converter 115 to the CPU 111. The CPU 111 then computes an in-focus evaluation according to a specified evaluation function. Based on the computed evaluation, the CPU 111 adjusts the relative distance between the objective 108 and the object to be observed 105 with the adjusting means 118 so that the in-focus degree may be maximized.

Depending on the object to be observed 105, there may be cases where the in-focus evaluation is too small to sense the in-focus state, or defocus changes in the in-focus evaluation is too gentle to obtain good in-focus accuracy. Because of this, the aperture stop 106 is further driven by the aperture stop driving means 117 according to the obtained in-focus evaluation until the numerical aperture of the lighting optical system has become the optimum value for in-focus sensing. After this, the in-focus operation is continued to obtain a highly accurate in-focus position.

In the present embodiment, since the numerical aperture of the lighting optical system is made smaller than the numerical aperture suitable for observation when the magnification of the objective 108 is low, whereas it is made larger when the magnification is high, changes in the defocus characteristics of the in-focus evaluation curve due to the change of magnification of the objective 108 can be minimized. Consequently, a highly accurate in-focus adjustment can be always achieved without being affected by the change of magnification of the objective 108.

With the present embodiment, after the focal point adjustment has been completed, it is, of course, possible to set the numerical aperture of the lighting optical system, automatically or manually as required by the operator, to a value suitable for observation at the magnification of the objective 108.

FIG. 7 shows a fifth embodiment of the present invention. In this embodiment, the image of the object to be observed 105 formed by the image formation system is received by a pair of imaging elements 121 and 122 composed of light-receiving element rows placed before and after the expected image formation plane. A half mirror 123 and a reflecting mirror 124 are arranged on the image side of the image formation lens 109 constituting the image formation optical system. After the light emerging from a point on the object to be observed 105 has passed through the objective 108 and the image formation lens 109, it is divided into two by the half mirror 123, one of which is received by the imaging element 121 placed on the optical axis before the expected image formation plane, and the other of which is reflected by the reflecting mirror 124, and then received by the imaging element 122 placed on the optical axis after the expected image formation plane.

The imaging elements 121 and 122 are driven with a specified timing by an instruction send from the CPU 111 via timing circuits 125 and 126 and imaging element drivers 127 and 128. The resulting image signal is amplified by preamplifiers 129 and 130, converted into a digital signal by A/D converters 131 and 132, and supplied to the CPU 111. The remaining construction is the same as that of the fourth embodiment, the same reference characters indicating the same actions.

In the present embodiment, like the fourth embodiment, at a command to start the in-focus operation, the CPU 111 first takes in optical conditions from the sensing means 116, and based on the optical conditions, drives the aperture stop 106 with the aperture stop driving means 117 to adjust the numerical aperture of the lighting optical system so as to achieve almost the optimum in-focus evaluation.

After the numerical aperture of the lighting optical system has been adjusted so that almost the optimum in-focus evaluation may be obtained, the CPU 111 drives the imaging elements 121 and 122 via the timing circuits 125 and 126 and imaging element drivers 127 and 128. The resulting image signal is supplied via the preamplifiers 129 and 130 and A/D converters 131 and 132 to the CPU 111. The CPU 111 then computes in-focus evaluations according to a specified evaluation function, and obtains the defocus amount by comparing those evaluations. The CPU 111 adjusts the relative distance between the objective 108 and the object to be observed 105 with the adjusting means 118 so that the defocus amount may be minimized.

Depending on the object to be observed 105, there may be cases where the in-focus evaluation is too small to sense the in-focus state, or defocus changes in the in-focus evaluation is too gentle to obtain good in-focus accuracy. Because of this, the aperture stop 106 is further driven by the aperture stop driving means 117 according to the obtained in-focus evaluation until the numerical aperture of the lighting optical system has become the optimum value for in-focus sensing. After this, the in-focus operation is continued to obtain a highly accurate in-focus position.

In the present embodiment, like the fourth embodiment, since the numerical aperture of the lighting optical system is made smaller than the numerical aperture suitable for observation when the magnification of the objective 108 is low, whereas it is made larger when the magnification is high, changes in the defocus characteristics of the in-focus evaluation curve due to the change of magnification of the objective 108 can be minimized. Consequently, a highly accurate in-focus adjustment can be always achieved without creating a dead zone where the difference between in-focus evaluations obtained from the image signals from a pair of imaging elements 121 and 122 is continuously zero.

With the present embodiment, after the focal point adjustment has been completed, it is, of course, possible to set the numerical aperture of the lighting optical system, automatically or manually as required by the operator, to a value suitable for observation at the magnification of the objective 108.

While in the above embodiment, the numerical aperture of the lighting optical system is adjusted so as to achieve almost the optimum in-focus evaluation on the basis of optical conditions including the magnification of the objective and its numerical aperture and of the in-focus evaluation obtained by performing an operation on the image signal from the imaging element according to a specified evaluation function, the numerical aperture of the lighting optical system may be controlled on the basis of the in-focus evaluation only, or of optical conditions only.

When the numerical aperture of the lighting optical system is controlled on the basis of the in-focus evaluation only, the in-focus operation is first started with the user settings. The relative distance between the objective 108 and the object to be observed 105 is adjusted based on the in-focus evaluation obtained by performing an operation on the image signal from the imaging element according to a specified evaluation function. After the in-focus position is almost reached, the aperture stop 106 is driven by the aperture stop driving means 117 on the basis of the in-focus evaluation at that time. After the numerical aperture of the lighting optical system has been brought to a value suitable to in-focus sensing, the in-focus operation is resumed to obtain a highly accurate in-focus position. In this way, to control the numerical aperture of the lighting optical system based the in-focus evaluation only, the sensing means for detecting optical conditions including the magnification of the objective and its numerical aperture are unnecessary.

This embodiment can be effectively applied to focal point sensing with not only microscopes, but also other various types of optical apparatuses having the lighting optical system.

As described above, the fourth and fifth embodiments are provided with an aperture stop for changing the numerical aperture of the lighting optical system and an aperture stop driving means for driving the aperture stop. The aperture stop driving means is driven so that almost the optimum in-focus evaluation may be obtained on the basis of the image information obtained from the light-receiving element row and/or optical conditions including the numerical aperture of the image formation optical system. Because of this, the defocus characteristics of the in-focus evaluation curve at high magnifications of the objective can approximate those at low magnifications as much as possible without greatly modifying the construction of existing microscopes and other optical instruments, thereby reducing the adverse effect of the change of magnification of the objective. Accordingly, almost the optimum in-focus evaluation can be always obtained for the object to be observed having various power spectra or under optical conditions including the numerical aperture of the image formation optical system, allowing the focal point state to be sensed constantly at high accuracy.

A sixth embodiment of the present invention will be explained.

A basic concept of the sixth embodiment will be described, referring to FIGS. 8, 9A, and 9B.

Figure 8:
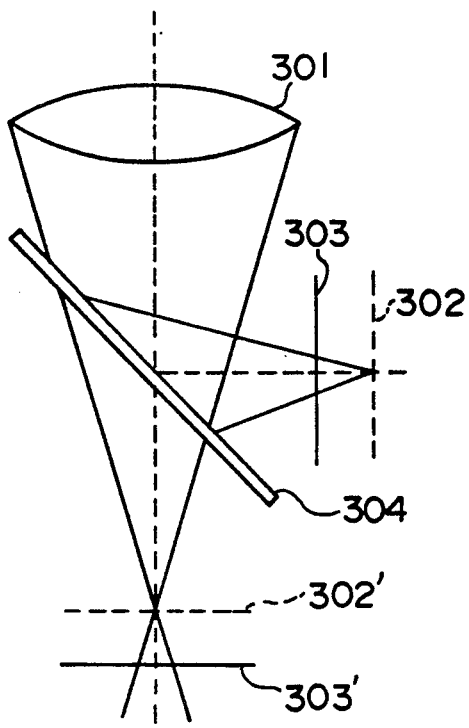
FIG. 8 is an optical arrangement for explaining the concept of a sixth embodiment of the present invention.

In FIG. 8, numeral 301 indicates an image formation optical system; 303, 303' two image sensors for imaging two object images near the expected image formation plane; 304 an optical system for projecting the two object image onto the two image sensors; and 302, 302' the expected image formation planes of the image formation optical system.

Figure 9A:
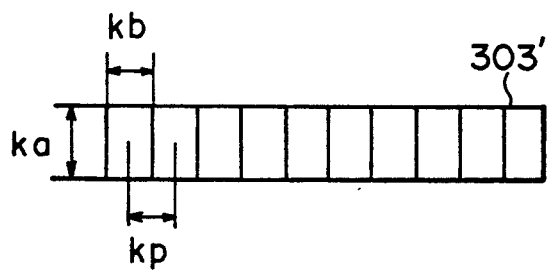
FIGS. 9A and 9B are diagrams of the image sensing surface of an image sensor for explaining the concept of the sixth embodiment.
Figure 9B:
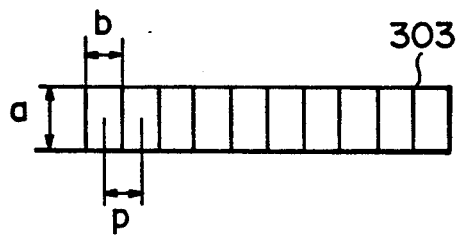

FIGS. 9A and 9B show the imaging surface of line sensors of 10 elements as examples of the two image sensors 303 and 303'. In the imaging surface of the image sensor 303, the dimensions of the pixel are a in length and b in width with a pixel pitch of p. For the imaging surface of the image sensor 303', the dimensions of the pixel are ka in length and kb in width with a pixel pitch of kp. In this way, the present embodiment is characterized in that the ratio of the two image sensors in terms of pixel dimensions and pitch is a constant value of k.

Specifically, in the present embodiment, when the object image is projected, the image formation optical system 301 forms an in-focus image and an out-of-focus image on the image sensors 303 and 303', the out-of-focus image being k times as large as the in-focus image. k is deter mined by the image formation optical system 301. For a normal microscope, it is 1.1 or more. Since the imaging surfaces of the two image sensors 303 and 303' are formed as shown in FIG. 9, the in-focus image is sensed with the pixel dimensions and pitch of FIG. 9A. The out-of-focus image k times as large as the in-focus image is sensed with the k-fold pixel dimensions and pitch of FIG. 9B.

Therefore, it is possible to sense two object images, which are related to each other with a magnification ratio of k, with the same resolving power for the spatial frequency distribution inherent to the objects.

Referring to FIG. 10, the sixth embodiment will be explained in detail.

Numeral 301 indicates an image formation optical system, and 303 denotes an image sensor for sensing two object images near the expected image formation plane. Projection optical systems 304 and 304', each of which is composed of a half mirror and a mirror or a prism, are used to project the two object images onto the image sensor 303. A correction circuit 305 corrects the output of the image sensor in terms of fixed pattern noise, dark current component, and others, in a manner that corrects each pixel in synchronization with an externally supplied clock signal. A variable gain amplifier 306 controls the gain according to an external control signal. An A/D converter 307 performs A/D conversion in synchronization with an externally supplied clock signal. A driver 308 externally receives a clock signal, converts it into a signal suitable for driving the image sensor 303, and supplies it to the image sensor 303. A memory circuit 309 temporarily stores the image signal read at a high speed in synchronization with the externally supplied clock signal. A timing controller 310 supplies the clock signals to each of the correction circuit 305, variable gain amplifier 306, A/D converter 307, driver 308, and memory circuit 309.

The CPU 311 controls the timing controller 310, reads the image data from the memory circuit 309 to compute in-focus evaluations, and supplies the result. A display circuit 312 displays the in-focus evaluation result from the CPU 311 on the screen in front of the operator of the in-focus sensing apparatus.

Figure 11:
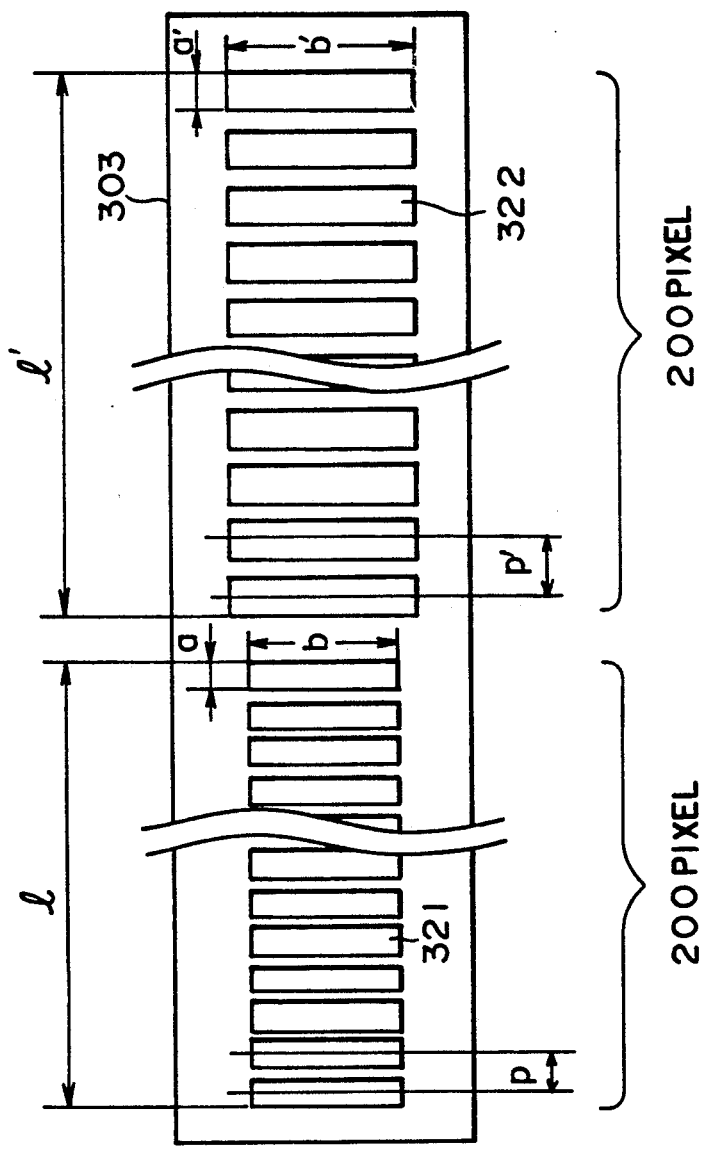
FIG. 11 is a view of the light-receiving section of the image sensor of FIG. 10.

FIG. 11 illustrates the light-receiving section of the image sensor 303. A line sensor like this is used in the present embodiment. A row of 200 pixels 321 for in-focus image reception and a row of 200 pixels 322 for out-of-focus image reception are arranged in a single line. The size of pixel 321 has a length of a and a width of b, and those pixels are arranged with a pitch of p. The size of pixel 322 has a length of a' and a width of b', and those pixels are arranged with a pitch of p'.

The light-receiving area for in-focus images has a length of b and a width of l, and that for out-of-focus images has a length of b' and a width of l'. Those dimensions and pitches meet the following equations:

$$a' = ka$$
$$b' = kb$$
$$p' = kp$$
$$l = 200 \times p - (p - a)$$
$$l' = 200 \times p' - (p' - a')$$

where k is a constant determined by the image formation optical system. k is approximately 1.2 in the present embodiment.

Referring to FIGS. 10, 11, and 12, the operation of this embodiment will be explained.

Figure 12A:
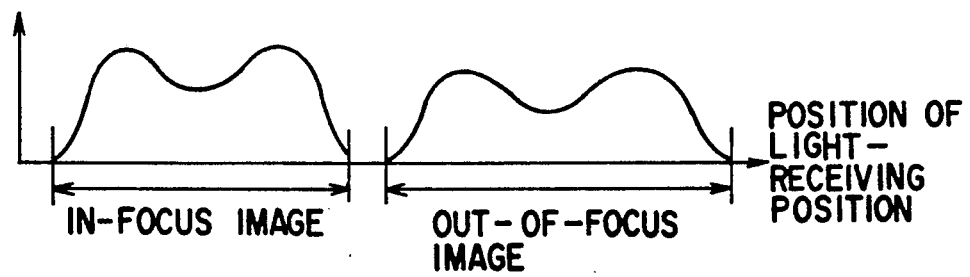
FIGS. 12A to 12D are waveform diagrams of the output of the image sensor.

The object image from the image formation optical system 301 is projected by the optical system 304 onto the image sensor 303 as an in-focus image and an out-of-focus image. An example of the projected image pattern is shown in FIG. 12A. The abscissa indicates the physical position of the line sensor in the direction of pitch. As shown in the figure, the luminance distribution of in-focus images differs from that of out-of-focus images in level and size. The out-of-focus image is k times as large as the in-focus image, and the level of the out-of-focus image is $1/k^2$ times as large as that of the in-focus image. k is a constant determined by the image formation optical system.

Figure 12B:
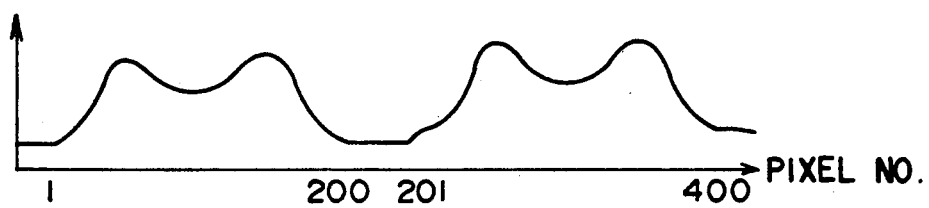
Figure 12C:
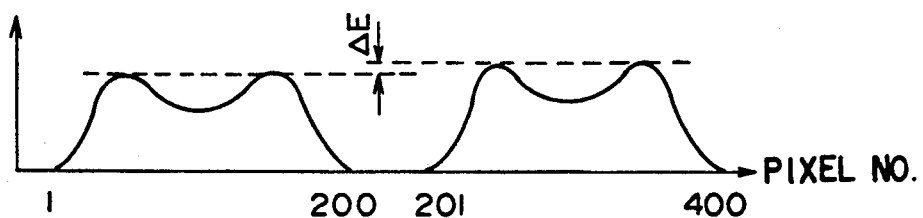
Figure 12D:
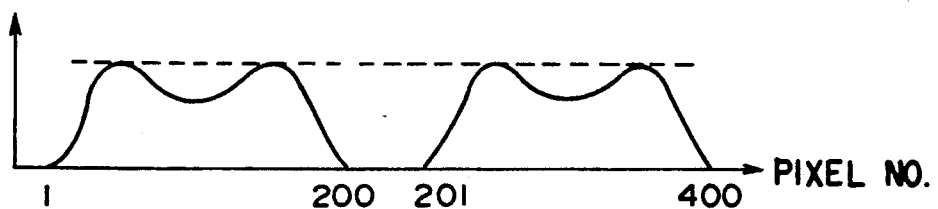

Since the storage time of the image sensor 303 is optimized by the timing controller 310, the output of the image sensor 303, which photoelectrically converts the object image, is shown in FIG. 12B, where the in-focus image is as large as the out-of-focus image. After the output of the image sensor 303 has been corrected at the correction circuit 305, the signal as shown in FIG. 12C is obtained. The in-focus image and out-of-focus image have an error of ΔE in FIG. 12C due to errors in sensors sensitivity, errors in the division ratio of the amount of light at the optical system 304, and others. Therefore, by changing the gain between the in-focus image output and the out-of-focus image, it is possible to make the output levels the same height as shown in FIG. 12D. In this way, the object image is made suitable for computation of in-focus evaluations without adding a new optical part.

Here, the CPU 311 sends to the timing controller 310 a control signal to start and stop the storing of the images from the image sensor 303, and to begin the reading of the image data that has been stored. When the reading of the image data has begun, the data converted into a suitable state by the variable gain amplifier 306 is supplied in time sequence. The output of the variable gain amplifier 306 is sequentially converted by the A/D converter 307 into digital data, which is stored as image data in the memory circuit 309.

After the reading of the image data has been completed, the timing controller 310 sends the end signal as a status signal to the CPU 311.

The CPU 311 reads the image data from the memory circuit 309, to compute in-focus evaluations, and displays the result on the screen of the display circuit 312. Representation may be any one of "before focus," "after focus," and "in focus." The distance to the in-focus point may be displayed.

By repeating the imaging, the imaging signal processing, the in-focus evaluation computation, and the display of the computation results, the focus indicator can display the in-focus degree in real time. Further, the focusing operation based on the in-focus evaluation result, of course, enables the construction of an automatic in-focus apparatus. While in the present embodiment, to facilitate the alignment of the image formation optical system 1 with the image sensor 303, the in-focus image sensing section and the out-of-focus image sensing section are formed on the same silicon substrate, in-focus image sensing and out-of-focus sensing may be done with separate image sensors.

Figure 13:
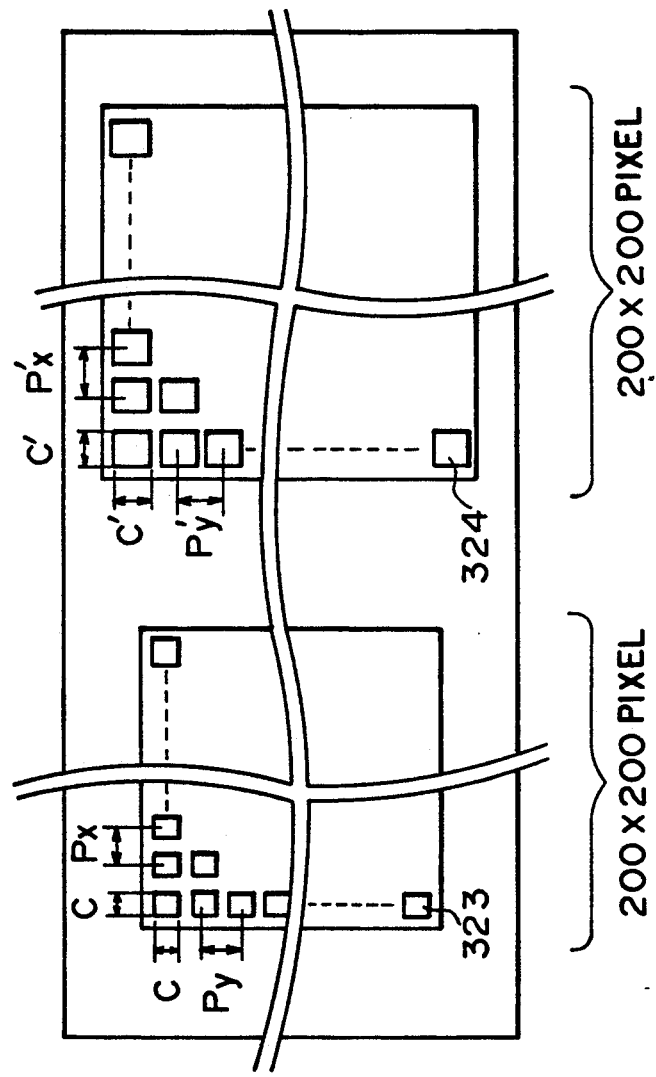
FIG. 13 is a schematic view of the light-receiving section of the image sensor in a seventh embodiment of the present invention.

A seventh embodiment of the present invention w 11 be explained, referring to FIG. 13.

This embodiment is an example of selecting an in-focus evaluation area by means of a two-dimensional area sensor as an image sensor. The block diagram of the system is the same as that of the sixth embodiment of FIG. 10. The shape of the light-receiving surface of the image sensor is shown in FIG. 13. An array of 200×200=40000 pixels 323 for in-focus image reception is arranged as so is an array of 200×200=40000 pixels 324 for out-of-focus image reception.

The size of pixel 323 is C in length and width, and those pixels are arranged with pitches of Px and Py. The size of pixel 324 is C' in length and width and those pixels are arranged with pitches of Px' and Py'.

Normally, to equalize sampling pitches in the x and y directions, they are set to fulfill Px=Py and Px'=Py'. C, C', Px, Py, Px', and Py' meet the following equations:

$$C' = kC$$
$$Px' = kPx \quad (Py' = kPy)$$

k is a constant determined by the image formation optical system, as with the sixth embodiment. Here, it is approximately 1.2.

In the present embodiment, like the sixth embodiment, the image data made suitably for subsequent processing is written into the memory circuit 309. Here, when the in-focus evaluation area is selected, the volume of the in-focus image data is allowed to correspond to that of the out-of-focus image data, which makes it easy for the CPU 311 to compute and load the image data from the memory circuit 309. When the pixel size and pitch of the in-focus image sensing area are equal to those of the out-of-focus image sensing area, it is very complex to load the pixel data on the same portion of the object image and perform computation at the time of area selection.

As described above, with the sixth and seventh embodiments, errors in in-focus point sensing due to the size difference between the in-focus image and out-of-focus image can be eliminated without adding a new optical part, thereby achieving very large reductions in the space and the cost.

As described so far, an automatic focal-point sensing apparatus according to the present invention needs no large optical difference even at a high magnification of the objective, and simplifies the structure of focal point sensing, which helps make the apparatus more compact, thereby expanding its application field to microscopes and other optical equipment.

We claim:

1. An automatic focal-point sensing apparatus, by comprising:
    a lighting optical system for illuminating a specimen;
    an objective optical system which receives the optical image from said specimen illuminated by said lighting optical system, and which forms a first optical image at a position a specified distance apart from and before the expected image formation plane and a second optical image at a position a specified distance apart from and after the expected image formation plane;
    at least one image sensor which has a first and a second light-receiving sections that receive said first and second optical images from said objective optical system, and which converts said first and second optical images received into corresponding electric signals;
    magnification sensing means for detecting the magnification of said objective optical system;
    computing means for calculating the contrast of each of said first and second optical images on the basis of said electric signals from said at least one image sensor; and
    in-focus sensing means which, when the sense result at said magnification sensing means is a low magnification, detects the in-focus point based on the difference in contrast between said first and second optical images calculated at said computing means, and which, when the sense result at said magnification sensing means is a high magnification, moves a portion of said objective optical system or said specimen in the direction of the optical axis, and detects the in-focus point based on changes in the contrast of one or both of said first and second optical images.

2. An automatic focal-point sensing apparatus, comprising:
    a lighting optical system for illuminating a specimen;
    a first optical system which receives the optical image from said specimen illuminated by said lighting optical system, and which forms a first optical image at a position a specified distance apart from and before the expected image formation plane and a second optical image at a position a specified distance apart from and after the expected image formation plane;
    at least one image sensor which has a first and a second light-receiving sections that receive said first and second optical images from said objective optical system, and which converts said first and second optical images received into corresponding electric signals;
    a second optical system provided adjacent to said first optical system so that the optical image from said specimen may be projected onto said expected image formation plane only; and
    in-focus sensing means for detecting the in-focus point by switching between said first and second optical systems according to specified conditions.

3. An automatic focal-point sensing apparatus according to claim 2, further comprising magnification sensing means for detecting the magnification of said first optical system, wherein said in-focus sensing means includes means for switching between said first and second optical systems according to the sense result at said magnification sensing means.

4. An automatic focal-point sensing apparatus according to claim 2, wherein said in-focus sensing means includes a means for switching between said first and second optical systems according to the brightness of the optical image projected onto said image sensor.

5. An automatic focal-point sensing apparatus according to claim 1, further comprising means for changing a numerical aperture of said lighting optical system based on the output signal from said image sensor.

6. An automatic focal-point sensing apparatus according to claim 1, further comprising means for changing a numerical aperture of said lighting optical system based on optical conditions including the numerical aperture and magnification of said objective optical system.

7. An automatic focal-point sensing apparatus according to claim 1, further comprising means for changing a numerical aperture of said lighting optical system based on optical conditions including the numerical aperture and magnification of said objective optical system and on the output signal from said image sensor.

8. An automatic focal-point sensing apparatus according to claim 1, wherein a ratio of pixel dimensions and pitch of said first light-receiving section to those of said second light-receiving section is constant in said image sensor.

9. An automatic focal-point sensing apparatus according to claim 2, further comprising means for changing a numerical aperture of said lighting optical system based on the output signal from said image sensor.

10. An automatic focal-point sensing apparatus according to claim 2, further comprising means for changing a numerical aperture of said lighting optical system based on the optical conditions including the numerical aperture and magnification of said objective optical system.

11. An automatic focal-point sensing apparatus according to claim 2, further comprising means for changing a numerical aperture of said lighting optical system based on optical conditions including the numerical aperture and magnification of said objective optical system and on the output signal from said image sensor.

12. An automatic focal-point sensing apparatus according to claim 2, wherein a ratio of pixel dimensions and pitch of said first light-receiving section to those of said second light-receiving section is constant in said image sensor.

* * * * *